US009540015B2

(12) United States Patent
Stahulak et al.

(10) Patent No.: US 9,540,015 B2
(45) Date of Patent: Jan. 10, 2017

(54) METHODS AND APPARATUS TO ALTER A VEHICLE OPERATION

(71) Applicant: AT&T Intellectual Property I, L.P., Atlanta, GA (US)

(72) Inventors: Charles M. Stahulak, Chicago, IL (US); Gregory Thomas Shaw, Sr., Morganville, NJ (US); Satya Vardharajan, San Diego, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/703,298

(22) Filed: May 4, 2015

(65) Prior Publication Data

US 2016/0325754 A1 Nov. 10, 2016

(51) Int. Cl.
*B60W 40/08* (2012.01)
*B60Q 5/00* (2006.01)

(52) U.S. Cl.
CPC .......... *B60W 40/08* (2013.01); *B60W 2540/28* (2013.01)

(58) Field of Classification Search
CPC .............. G01K 15/02; G01H 1/26; B60Q 5/00
USPC ................................. 701/36, 2, 22
See application file for complete search history.

(56) References Cited

U.S. PATENT DOCUMENTS

| 4,707,788 | A | 11/1987 | Tashiro et al. |
| 5,091,856 | A | 2/1992 | Hasegawa et al. |
| 5,410,477 | A | 4/1995 | Ishii et al. |
| 6,205,374 | B1 | 3/2001 | Kljima et al. |
| 6,356,185 | B1 | 3/2002 | Plugge et al. |
| 6,430,488 | B1 | 8/2002 | Goldman et al. |
| 6,751,534 | B2 | 6/2004 | Robichaux et al. |
| 7,978,056 | B2 | 7/2011 | Mercurio et al. |
| 8,417,436 | B2 | 4/2013 | Russell |
| 8,589,049 | B2 | 11/2013 | Craig |
| 8,761,998 | B2 | 6/2014 | Chen et al. |
| 8,825,222 | B2 | 9/2014 | Namburu et al. |
| 9,189,897 | B1* | 11/2015 | Stenneth ................ G07C 5/008 |
| 2002/0168071 | A1 | 11/2002 | Daly |
| 2010/0087987 | A1 | 4/2010 | Huang et al. |
| 2010/0274410 | A1 | 10/2010 | Tsien et al. |
| 2011/0040707 | A1 | 2/2011 | Theisen et al. |
| 2011/0307130 | A1* | 12/2011 | Gow .................. B60G 17/0195 701/22 |
| 2013/0328699 | A1* | 12/2013 | Schramm ............. G08G 1/0967 340/905 |

(Continued)

FOREIGN PATENT DOCUMENTS

FR 2845195 4/2004
GB 2476470 12/2011

(Continued)

OTHER PUBLICATIONS

BMW i8—Model Highlights—BMW North America, "A Plug-In Hybrid that Sparks Revolution in Every Ignition," [retrieved from internet at http://www.bmwusa.com/standard/content/Vehicles/2015/i8/bmwi8/modelhighlights/default.aspx on Jan. 28, 2015] (2 pages).

(Continued)

*Primary Examiner* — Tan Q Nguyen
(74) *Attorney, Agent, or Firm* — Hanley, Flight & Zimmerman, LLC

(57) ABSTRACT

Methods and apparatus are disclosed to alter the driving profile of a vehicle. An example method disclosed herein determines, based on a user selection, a desired driving profile to apply to a vehicle. The example method includes identifying a set of alterations to operating parameters of vehicle systems associated with the desired driving profile. The example method includes determining a subset of the set of alterations that the vehicle can execute, and in response to determining the subset that the vehicle can execute, applying the subset to the vehicle to produce the desired driving profile.

20 Claims, 6 Drawing Sheets

(56) References Cited

U.S. PATENT DOCUMENTS

| | | | |
|---|---|---|---|
| 2014/0277835 A1* | 9/2014 | Filev | G01C 21/3469 |
| | | | 701/2 |
| 2014/0297115 A1 | 10/2014 | Kang et al. | |
| 2014/0309806 A1 | 10/2014 | Ricci | |
| 2015/0016627 A1 | 1/2015 | Barlow, Jr. et al. | |
| 2015/0307081 A1* | 10/2015 | West | B60W 10/115 |
| | | | 701/22 |

FOREIGN PATENT DOCUMENTS

| | | |
|---|---|---|
| WO | 2012016722 | 2/2012 |
| WO | 2014120935 | 8/2014 |

OTHER PUBLICATIONS

"The 2015 Volt, Electricity Travels: Ready to Test the Limits of How Far Electric Cars Can Take You?" (7 pages).
Autotrader.com, "Infiniti Q50 Remembers Its Driver," [retrieved from internet at http://www.autotrader.com/research/article/car-news/212281/infiniti-q50-remembers-its-driver.jsp on Jan. 27, 2015] (2 pages).
Kia K 900, "2015 Kia K900 4dr Sdn Premium," [retrieved from internet at http://www.caranddriver.com/kia}, 2015 (7 pages).
Mitsubishi Motors Corporation, "Automobile Technology: Technology Library, The Plug-In Hybrid EV System," (5 pages).
Subaru, "It's What Makes a Subaru, A Subaru: Subaru Intelligent Drive (SI-Drive)," {retrieved from internet at http://drive2.subaru.com/Summer07_what makes.htm on Jan. 27, 2015] (3 pages).
Volkswagen, "Driver Profile Selection," 2015 (2 pages).

* cited by examiner

300 ⟶

| DRIVING PROFILE ⟵305 | STROKE LENGTH (CM) ⟵310 | BRAKING FORCE (N) ⟵320 | AIR INTAKE ANGLE (deg) ⟵330 | ... |
|---|---|---|---|---|
| SPORTS CAR | 28 | 300 | 35 | ... |
| SUPERCAR | 44 | 425 | 48 | ... |
| LUXURY SEDAN | 15 | 225 | 25 | ... |
| SUV | 35 | 322 | 28 | ... |

| DRIVING PROFILE ⟵305 | GEAR RATIO (X:1) ⟵340 | SUSPENSION HEIGHT (mm) ⟵350 | COOLANT FLOW RATE (L/min) ⟵360 | ... |
|---|---|---|---|---|
| SPORTS CAR | 28 | 300 | 35 | ... |
| SUPERCAR | 44 | 425 | 48 | ... |
| LUXURY SEDAN | 15 | 225 | 25 | ... |
| SUV | 35 | 322 | 28 | ... |

| | ⌐405 | ⌐410 | ⌐415 | ⌐420 | |
|---|---|---|---|---|---|
| VEHICLE | MAX STROKE LENGTH (CM) | MAX BRAKING FORCE (N) | MAX AIR INTAKE ANGLE (deg) | ... |
| Vehicle 102 | 20 | 220 | 28 | ... |

| | ⌐405 | ⌐425 | ⌐430 | ⌐435 | |
|---|---|---|---|---|---|
| VEHICLE | MAX GEAR RATIO (X:1) | MAX SUSPENSION HEIGHT (mm) | MAX COOLANT FLOW RATE (L/min) | ... |
| Vehicle 102 | 3.87 | 425 | 55 | ... |

FIG. 4

METHODS AND APPARATUS TO ALTER A VEHICLE OPERATION

FIELD OF THE DISCLOSURE

This disclosure relates generally to automotive control systems and, more particularly, to methods and apparatus to alter a vehicle operation.

BACKGROUND

Modern vehicles are controlled by networks of embedded systems, called electronic control units (ECUs), which control different aspects of the vehicle's performance and functionality. In some instances, an ECU may control an individual system or functionality. That is, the ECU may control and/or adjust the components of the system with which the ECU is associated, according to given operating parameters (e.g., maximum horsepower, maximum speed, gear shifting ratio, spark plug timing, air intake valve angle, fuel injection quantity, air/fuel ratio, etc.). For example, one or more ECUs may control engine operation as well as entertainment, power train, navigation, transmission, and braking systems. The decentralized control of a vehicle is facilitated by using a control area network (CAN) bus standard that allows ECUs to communicate with one another without the need for a host computer (e.g., head unit).

BRIEF DESCRIPTION OF THE DRAWINGS

FIG. 3 is an example tabular illustration of driving profiles used in accordance with the teachings of this disclosure.

FIG. 4 is an example tabular illustration of safety values used in accordance with the teachings of this disclosure.

The figures are not to scale. Wherever possible, the same reference numbers will be used throughout the drawing(s) and accompanying written description to refer to the same or like parts.

DETAILED DESCRIPTION

Figure 1:
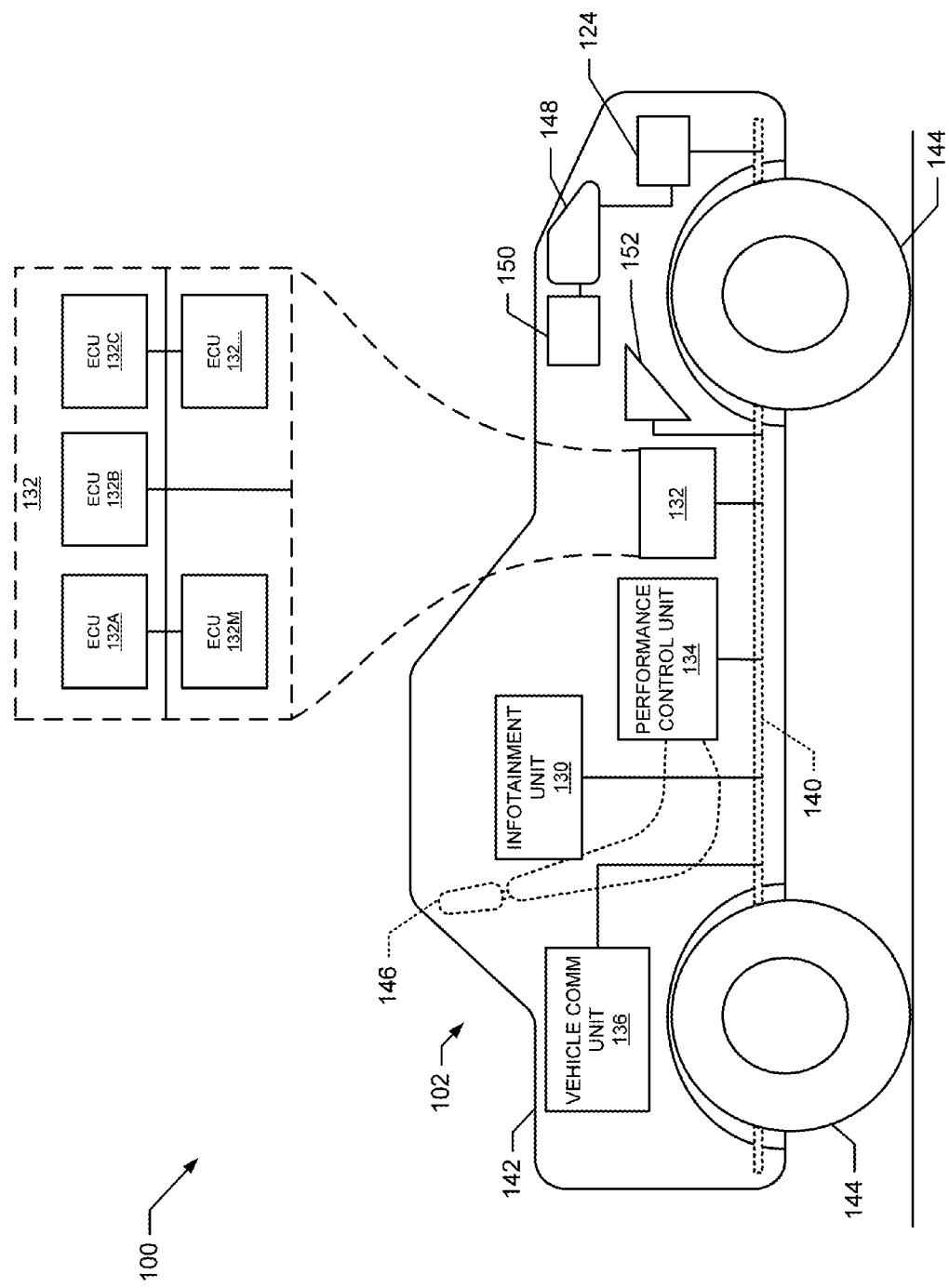
FIG. 1 illustrates an example system constructed in accordance with the teaching of this disclosure to alter the driving profile of a vehicle.

Examples methods disclosed herein include determining, based on a user selection, a desired driving profile to apply to a vehicle. The example method includes identifying a set of alterations to operating parameters of vehicle systems associated with the desired driving profile. The example method includes determining a subset of the set of alterations that the vehicle can execute, and in response to determining the subset that the vehicle can execute, applying the subset to the vehicle to produce the desired driving profile.

An example tangible article of manufacture comprising instructions is disclosed herein. The example instructions determine, based on a user selection, a desired driving profile to apply to a vehicle. The example instructions identify a set of alterations to operating parameters of vehicle systems associated with the desired driving profile. The example instructions determine a subset of the set of alterations that the vehicle can execute, and apply the subset to the vehicle to produce the desired driving profile when it is determined that the subset of alterations is executable by the vehicle.

An example apparatus is disclosed herein. The example apparatus includes an interface controller to determine, based on a user selection, a desired driving profile to apply to a vehicle. The example apparatus includes an instruction generator to identify a set of alterations to operating parameters of vehicle systems associated with the desired driving profile. The example apparatus includes a safety controller to determine a subset of the set of alterations that the vehicle can execute, and a communication bridge to apply the subset to the vehicle to produce the desired driving profile in response to the determination that the vehicle can execute the subset.

A modern vehicle's systems (e.g., engine, cooling, suspension, entertainment, etc.) operate within the confines of operating parameters configured into the systems' corresponding ECU. For example, many example parameters that may be adjusted are enumerated in U.S. Pat. No. 6,205,374, which is incorporated by reference herein in its entirety. ECUs, like the ones controlling individual systems in a vehicle, are specialized embedded systems (e.g., small form-factor computers) that contain a processor and a memory. ECUs also accept inputs and/or produce outputs. Like all computers, these ECUs may be given programmed instructions that can affect their output. For example, these instructions may conform to one or more automotive software architectures (e.g., AUTOSAR and/or manufacturer specific software architecture) corresponding to the native architecture of the ECU in question. The ECUs (1) control the operation of the vehicle according to operating parameters and (2) accept programmable instructions. Thus, the ECUs may accept programmed instructions that alter the control of the corresponding vehicle system (e.g., by changing the operating parameters for that system). For example, a cooling system ECU may accept programmed instructions that alter a target pumping rate for a coolant pump of the vehicle cooling system, or an ECU such as an Engine Control Module (ECM) may accept programmed instructions that alter fuel quantities injected to the piston chamber during engine operation.

As a further example, a mid-size sedan is produced with ECUs assigned operating parameters that control, among other things, gear shift timing, engine air intake, maximum speed, braking response, coolant flow rate, etc. Each of these system operating parameters is configured in the corresponding ECU by the manufacturer to achieve certain results, such as, a target horsepower, a top speed, an acceleration profile, a fuel consumption rate, a tactile steering response, a level of shock dampening, an information presentation (e.g., in a console display), etc. Collectively, operating parameters, such as these, give drivers of vehicles a certain feel and/or performance indicative of a make (e.g., coupe, sedan, sports utility vehicle (SUV)) and/or type (e.g., muscle, supercar, luxury, economy, etc.) of vehicle. In some examples, the feel and/or performance of a vehicle may be referred to herein as "driving profiles." Because different vehicle models contain varying amounts of ECUs configured with different operating parameters, each vehicle model has a unique driving profile (e.g., a unique feel and/or performance).

Suppose, for example, a generic vehicle were manufactured that was not biased in design towards a sports car nor a luxury sedan, and the example generic vehicle were given programmed instructions comprising a driving profile (e.g., a collection of operating parameters) associated with either a sports car or a luxury sedan, and then driven. The driving profile of the sports car contains operating parameters quite different from the driving profile of the luxury sedan. Some example operating parameters of the driving profile for the sports car may include short gear ratios in the gear box (e.g., providing high torque at low speeds), high amounts of air intake in the engine, no maximum speed control, lower spring rate in the suspension (e.g., lower to the ground ride), data rich instrumentation presented in the cockpit console (e.g., telemetry information and/or systems status information), etc. The sports car driving profile creates a fast accelerating, high speed, tightly controlled ride with ample information presentation to allow the driver to monitor the relevant systems of the generic vehicle.

Some example operating parameters of the driving profile for the luxury sedan may include long gear ratios in the gear box (e.g., providing smooth acceleration and increased fuel economy), normal amounts of air intake in the engine, instituted maximum speed control, high damping in the suspension (e.g., for a smoother ride), media rich presentation in the cockpit console, etc. The luxury sedan driving profile creates a smooth accelerating, controlled, luxury ride with entertainment provided to enhance the experience of the ride. It can be appreciated from the above examples that the sports car driving profile would provide a markedly different performance or feel than the luxury sedan driving profile.

In examples disclosed herein, driving profiles (e.g., sets of operating parameters) for different vehicle makes and/or types are collected by a manufacturer and/or third party. The driving profiles may take many different forms. For example, driving profiles may be configuration files, data structures, markup language documents, text files, etc. These driving profiles are offered to consumers so that the consumer may enact changes to their vehicle's feel and/or performance to emulate the driving profile of other vehicle makes and/or types. For example, a consumer may desire to alter the performance of their economy sedan to emulate and/or mirror the driving profile of luxury sedans.

In one example, the consumer purchases or selects (e.g., via a console display of an infotainment unit in the vehicle) a luxury sedan driving profile, and a set of operating parameters (e.g., a set of alterations to operating parameters) corresponding to the luxury sedan driving profile is acquired by the consumer's economy sedan from, for example, a remote server and/or a remote device such as a smartphone. The acquired driving profile is analyzed by an example performance control unit (PCU) to validate the driving profile operating parameters for safety. The set of operating parameters in the driving profile are validated against a set of rules defining operation of the vehicle. A first subset of operating parameters that conform to the set of rules are marked as valid. A second subset of operating parameters in the driving profile are marked as invalid when the second subset does not conform the set of rules defining operation of the vehicle, and the first subset of the operating parameters are stored. Instructions corresponding to the operating parameters of the first subset are transmitted to a corresponding electronic control unit.

That is, the driving profile operating parameters are validated against a set of rules (e.g., operating parameter safety values) that defines the operation of the existing systems of the consumer's economy sedan. The validation is to ensure that (1) changes made to existing operating parameters do not make the consumer's economy sedan unsafe to drive and (2) that improper wear is not induced into the components of the economy sedan after the operating parameters are changed. For example, the engine air intake operating parameter is validated so that an improper amount of air is not allowed into the engine, and thus damaging the engine. As a further example, the gear shift ratio operating parameter of the luxury sedan driving profile is validated against the capabilities of the gearbox of the economy sedan to ensure that the economy sedan gearbox can execute the luxury sedan gear shift ratio in the luxury sedan driving profile Improper gear shift ratios may cause damage the engine and/or clutch of the economy sedan (e.g., through unnecessary heating). If the operating parameters are validated as safe against the safety values, they are applied to the consumer's vehicle to achieve the desired driving profile (e.g., to achieve a performance emulation).

In some examples, driving profiles may be activated based on certain parameters (e.g., activation parameters) such as, for example, the detection of the presence of a certain user. For example, a vehicle may detect a smartphone associated with a user and implement a favorite driving profile of the user. Additional activation parameters may include geographic location. For example, a vehicle entering mountainous terrain may enable a stored SUV and/or all-wheel drive driving profile to better handle potential conditions. Another activation parameter may be current driving conditions (e.g., traffic congestion data obtained from a navigation application in the infotainment system, current weather conditions at the location of the vehicle, road type according to the navigation application (e.g., highway, street, dirt road, etc.)). For example, detected weather may enable a stored SUV and/or all-wheel drive driving profile to better handle potential conditions. Another example condition may be grid-locked traffic. For example, the vehicle may transition to an economy sedan driving profile to conserve fuel in a grid-lock. Another parameter may include vehicle status. For example, a certain driving profile associated with past successful driving may be activated when problems are detected in the vehicle. Another activation parameter may be driving profiles of other vehicles in the vicinity of the vehicle using the example performance control unit disclosed herein. For example, when a particular driving profile is detected as enabled in a nearby vehicle, the performance control unit may enable that particular driving profile in the vehicle in question.

In some examples, driving profiles may be disabled through security parameters (e.g., driver permissions). For example, when allowing a valet to operate the vehicle, a setting may be enabled that prevents the use of particular ones of driving profiles stored on the vehicle.

FIG. 1 illustrates an example system 100 constructed in accordance with the teaching of this disclosure to alter the driving profile of a vehicle 102. In the illustrated example, the vehicle 102 includes a collection of ECUs 132, a performance control unit (PCU) 134, a vehicle communication unit 136, and an infotainment unit 130 connected to and communicating via a data bus 140. The data bus 140 of the example vehicle 102 provides pathways for multiple network protocol communications (e.g., control area network (CAN), local interconnect network (LIN), media oriented system transport (MOST), etc.).

The example ECUs 132 of FIG. 1 are discrete computing devices. The example ECUs 132 contain a processor (e.g., a microcontroller) to process data and execute programmable instructions (e.g., assembly level instructions, functional sequential instructions, and/or object oriented instructions). The example ECUs 132 also are provided with on-board memory (e.g., Static Random Access Memory (SRAM), Electrically Erasable Programmable Read Only Memory (EEPROM), and/or Flash memory) to store data received and/or generated by the ECU 132. The example ECUs 132 are further provided with Input and/or Output (I/O) ports such as supply voltage inputs, digital and/or analog inputs, relay drivers, H-bridge drivers, injector drivers, and/or logic outputs. These I/O ports are used by the ECU 132 to receive data from sensors and transmit signals to mechanical components (e.g., actuators) to affect the mechanical components operations based on the operating parameters of the driving profile. The received data and/or the transmitted signals are communicated from the ECU 132 via the data bus 140 or through a directly wired connection between the ECU 132 and the mechanical component.

The example ECUs 132 of FIG. 1 control low level systems (e.g., door controls, headlight controls, engine controls, transmission controls, climate controls, seat controls, mirror controls, etc.) and/or high-level systems (e.g., radio systems, voice controls, entertainment systems, a telematic control unit managing a GPS/Navigation system, etc.) connected to the data bus 140. Each ECU 132 monitors its corresponding system by reading sensor signals. These sensors are placed on the mechanical components of the system and report factors such as position, temperature, speed, etc. These factors contribute to if, when, and/or how the ECU 132 generates output signals to execute control over the corresponding system.

For example, the ECU 132 responsible for door control has sensors monitoring door lock buttons, position of doors (e.g., open or closed), door locks (e.g., engaged or disengaged), and/or child lock switches (e.g., engaged or disengaged). Based on the readings of these sensors, the door control ECU 132 may, for example, make a decision on whether or not to generate a lock engaging signal to the doors of the vehicle.

Each of the ECUs 132 may be of different size and/or complexity according to the system the individual ECU 132 is controlling. In the illustrated example, the ECUs 132 are in communication with other units of the vehicle via the data bus 140. In some examples, the ECUs 132 may send and/or receive information and/or driving profiles (e.g., the status of the systems or components of the vehicle, diagnostic information, telemetry data, etc.) to a remote device (e.g., a mobile device such as a smartphone, tablet, smartwatch, etc.) via the vehicle communication unit 136 and/or may receive information (e.g., commands, driving profiles, operating parameters, firmware/software updates, media files, etc.) from the remote device via the vehicle communication controller 136. For example, such information may be communicated between the ECUs 132 and the remote device using a Bluetooth, Wi-Fi, or near field communication (NFC) connection generated and/or managed by the example vehicle communication unit 136.

Typically, ECUs are deployed in a one-to-one fashion. That is, each ECU is provided with processing power and system memory ample enough to control a corresponding single system of the vehicle. Each ECU will vary in size according to the complexity of the corresponding system. For example, an ECM is a more robust ECU than the transmission ECU. In some examples, however, the ECUs 132 in the example vehicle 102 may be more robust than a typical ECU and capable of controlling multiple systems (e.g., the ECM may control the engine and the transmission system). For example, a robust ECU may be provided with amounts of processing power greater than a typical ECU processor (e.g., more cores, faster clocking speeds, larger processing cache, etc.) and higher amounts of random access memory (RAM) may control more than one system as is typical of the average ECU.

The example vehicle 102 of FIG. 1 is provided with the example infotainment unit 130 that includes components such as a dashboard display, a media center, a center console display, driver accessible buttons (e.g., climate controls, door lock controls), etc. The infotainment unit 130 may also include a data store to store media (e.g., movies, music, television programs, podcasts, etc.), system firmware, navigation data, diagnostic information, data collected by data collection systems (e.g., cameras mounted externally on the vehicle 102, weather data collection, etc.), driving profiles, etc. The example infotainment unit 130 also functions as a human machine interface that provides options to the driver of the vehicle 102 and communicates the driver's selected options to the corresponding ECU 132 and/or the example PCU 134. For example, infotainment unit 130 may present driving profile selection options to the driver via a center console display and communicate the selected driving profile to the example performance control unit 134.

In the illustrated example of FIG. 1, the vehicle communication unit 136 of the illustrated example manages communications between the example vehicle 102 and network entities (e.g., a car manufacturer, a telecommunication service provider, an internet service provider, a media provider, etc.) via a wired and/or wireless connection (e.g., an IEEE 802.11 wireless connection, a Bluetooth connection, a cable/DSL/satellite modem, a cell tower, etc.). In some examples, the vehicle communication unit 136 may be implemented as an array of communication platforms (e.g., Bluetooth modem, NFC reader, RF communication array, 4G/LTE/GSM modem, etc.). The vehicle communication unit 136 of the illustrated example maintains network information (e.g., a network address, network settings, etc.) required to send and/or receive data over the various communication platforms. The example vehicle communication unit 136 manages the connections between the vehicle and outside entities (e.g., a Bluetooth connection between a mobile device and the example PCU 134). In some examples, the vehicle communication unit 136 may establish communicative connections with different network entities (e.g., a car manufacturer, a telecommunication service provider, an internet service provider, a media provider, etc.) to send data from the vehicle 102 to the network entities and/or receive data from the network entities for delivery to the vehicle (e.g., driving profiles). In addition, the vehicle communication unit 136 may communicate with a computing device, such as a personal electronic device (e.g., a smartphone, a tablet, a smart watch, etc.), a personal computer (e.g., a desktop, a laptop, etc.), a diagnostic computer (e.g., at a dealership, etc.), etc. In some examples, one or more computing devices connected to the vehicle 102 via the vehicle communication unit 136 may transmit and receive information, such as vehicle diagnostic data, media files (e.g., movies, music, television programs, etc.) uploaded to a memory of the vehicle 102, firmware and/or software updates, driving profiles, etc.

The example PCU 134 of the illustrated example may be implemented by any device accompanying software that accepts, processes, and/or transmits data within a vehicular information network (e.g., data bus 140). The example PCU 134 may be a computing device of varying sophistication. For example, the PCU 134 may be as simply constructed as a microcontroller, or the PCU 134 may be as sophisticated as a desktop computing device. The example PCU 134 is in communication with other components of the vehicle 102 such as, the ECUs 132, the vehicle communication unit 136, and the infotainment unit 130 via the data bus 140. In the example FIG. 1, the PCU 134 acts as the controller of all ECUs 132 in the vehicle 102. That is, in certain examples, the PCU 134 can instruct and/or alter changes to the operating parameters of the example ECUs 132 of the example vehicle 102.

In the illustrated example of FIG. 1, the example PCU 134 acquires driving profiles to use in the example vehicle 102 via the example vehicle communication unit 136. For example, the PCU 134 may be in communication with (e.g., via the vehicle communication unit 136) a remote server storing driving profiles. Information describing available driving profiles at the remote server is collected by the example PCU 134 and presented via a display of the example infotainment unit 130. The driving profile selected via the infotainment unit 130 is transmitted to the example PCU 134. The example PCU 134 determines if the selected driving profile is stored locally and, if the selected driving profile is not stored locally, the example PCU 134 requests and/or obtains the selected driving profile from the remote server. In some examples, the driving profiles are obtained as an e-commerce transaction. In other examples, the driving profiles are obtainable from the remote server in a subscription based service.

In other examples, a mobile device may be in communication with the example PCU 134 via the vehicle communication unit 136. The example mobile device may have acquired and stored driving profiles for the example vehicle 102 via a mobile application in communication with the remote server storing the driving profiles. While in communication with the example PCU 134, a driving profile may be selected via a user interface of the mobile device. After selection, the driving profile is transmitted from the mobile device to the example PCU 134 via the vehicle communication unit 136.

The example PCU 134 applies changes to operating parameters of corresponding ECUs 132 based on the driving profiles. For example, when a selected driving profile is communicated to the example PCU 134, the PCU 134 analyzes the driving profile for new operating parameters. The new operating parameters are validated against safety rules and/or maximum settings for the example vehicle 102. For example, the new operating parameters may be compared to a table of maximum operating parameters for the example vehicle 102. The table of maximum operating parameters may be compiled by a public or private institution according to the design of the vehicle and may alternatively be a data structure and/or file saved in a memory housed in the example vehicle 102. The table of maximum operating parameters serves to ensure that the example vehicle 102 is not operating at increased risk to the components and/or systems of the vehicle 102 and/or the driver of the vehicle 102.

The new operating parameters in the processed driving profile that do not exceed the corresponding maximum operating parameter are stored as validated by the example PCU 134. When a new operating parameter is validated, the example PCU 134 generates instructions to change the current operating parameter for the example vehicle 102. That is, instructions are generated for the ECU 132 that uses the operating parameter. The generated instructions are then transmitted from the example PCU 134 to the corresponding ECU 132.

In some examples, failure to validate an operating parameter from a driving profile may result in no change to the current operating parameter of the example vehicle 102. In other examples, when an operating parameter from the new driving profile exceeds a corresponding maximum operating parameter for the example vehicle 102, instructions are generated by the example PCU 134 to change the current operating parameter to the maximum allowable operating parameter according to the table of maximum operating parameters.

When the instructions have been executed to change the operating parameters of the vehicle 102 according to the new driving profile, the example vehicle 102 may have a different level of performance and/or "feel" while under operation by a driver.

In the illustrated example of FIG. 1, the vehicle 102 includes an example body 142, example wheels 144, an example seat 146, an example motor 148, an example cooling system 150, and an example transmission 152. In the illustrated example, the body 142 covers the exterior of the vehicle 102 to protect and/or contain the other parts of the vehicle 102. In the illustrated example FIG. 1, example ECU 132A controls braking systems, ECU 132B controls the cooling system, and ECU 132C controls the transmission system.

In the illustrated example, the motor 148 may be implemented by a combustion engine, a DC electric motor, and/or an AC electric motor. The example motor 148 is communicatively coupled to an example ECU 132 (e.g., ECU 132M) and the example transmission 152. The example ECU 132 (e.g., ECU 132M) receives operating power from the batteries 124 to control components of the motor 148 (e.g., throttle valve, sparkplugs, pistons, fuel injectors, etc.). The example ECU 132M receives signals from a driver (e.g., via sensors in a pedal, etc.) to determine corresponding control signals to communicate to the example motor 148 (e.g., manipulating throttle valve, firing spark plugs, altering fuel injection quantities, etc.). In the illustrated example, the motor 148 supplies torque to the transmission 152 to drive two or more wheels 144.

Figure 2:
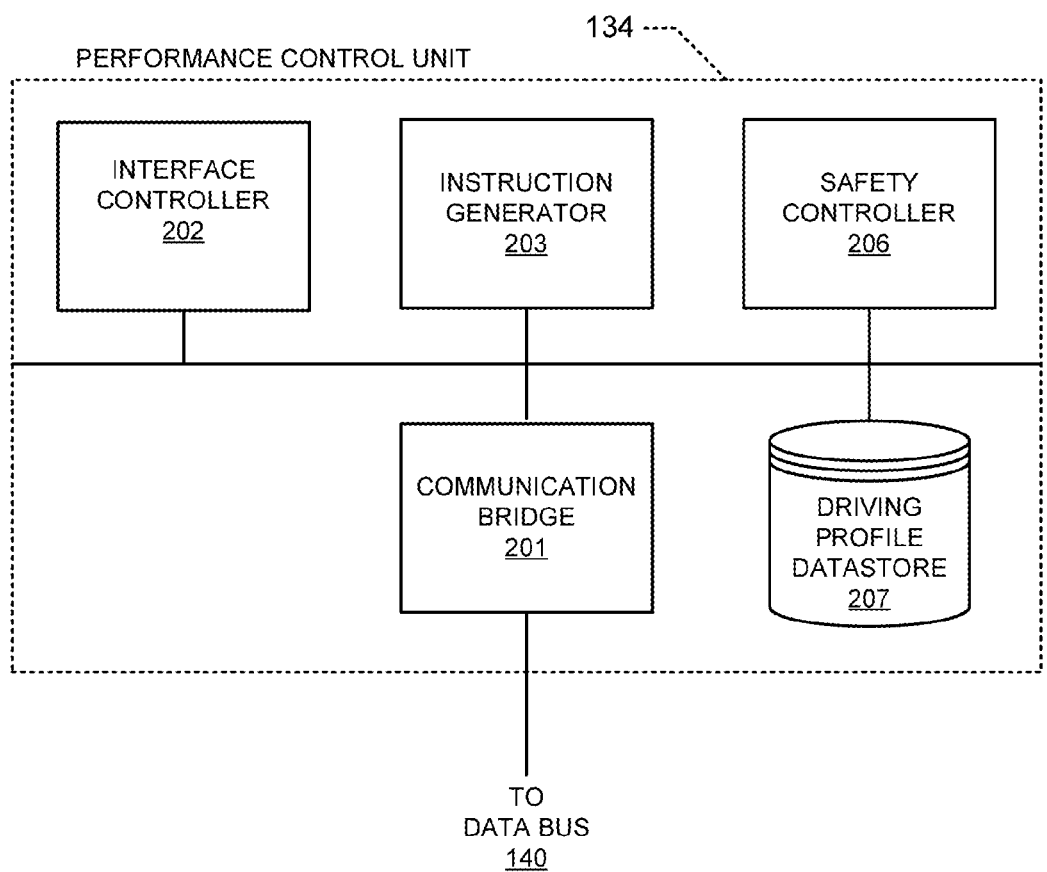
FIG. 2 illustrates an example implementation of the performance control unit of FIG. 1.

FIG. 2 is a block diagram of an example implementation of the example PCU 134 of FIG. 1. In the example of FIG. 2, the PCU 134 includes an example communication bridge 201, an example interface controller 202, an example instruction generator 203, an example safety controller 206, and an example driving profile data store 207.

The example communication bridge 201 manages communication originating from or directed to the example PCU 134. In this way the communication bridge is responsible for applying the changes to the driving profile of the vehicle by transmitting the signals to alter the operating parameters of the ECUs in the vehicle. The example communication bridge 201 encodes and decodes messages between the PCU 134 and the rest of the vehicle (e.g., the vehicle communication unit 136, the infotainment unit 130, the ECUs 132, etc.) via the data bus 140, etc. In some examples, the example PCU 134 leverages the communication bridge 201 to communicate with a remote device (e.g., a smartphone) and/or a remote server using the vehicle communication unit 136 to establish an external data connection (e.g., Wi-Fi, LTE, Bluetooth, NFC, etc.). In some examples, the communication bridge 201 drives the vehicle communication interface 130 (e.g., powers the antenna in the radio frequency waveguide, drives the loop-inductor-antenna of the NFC system, etc.). The example communication bridge 201 also marshals, arbitrates, and/or manages messages from the example PCU 134 to send to corresponding ECUs 132 based on changes dictated by a requested driving profile.

The example interface controller 202 detects requests to alter the driving profile of the example vehicle 102. In the example FIG. 2, the interface controller 202 is in communication with the example instruction generator 203, the example communication bridge 201, the example safety controller 206, and the example driving profile datastore 207. For example, a request to alter the driving profile of the vehicle may be selected by a driver via interaction with the example infotainment unit 130 of FIG. 1 (e.g., via a touchscreen interface). The example interface controller 202 detects the request and determines the identification of the selected driving profile (e.g., via a message communicated across the data bus 140 by the example infotainment unit 130).

Additionally, when the request to alter the driving profile is detected, the example interface controller 202 verifies that the requested driving profile is stored locally (e.g., in the driving profile datastore 207). If the requested driving profile is not stored locally, the example interface controller 202 generates a request to a remote device and/or server to obtain the requested driving profile (e.g., via the communication bridge 201). When obtained, the requested driving profile is stored in the example driving profile datastore 207 and verified as being stored locally. When the driving profile is verified as stored locally, the example interface controller 202 notifies the instruction generator 203 of the requested driving profile and that the requested driving profile is stored locally in the driving profile datastore 207.

The example instruction generator 203 generates and transmits instructions to the ECUs 132 of the example vehicle 102. The instructions generated and transmitted by the example instruction generator 203 cause the ECUs 132 to adjust the various operating parameters of the vehicle. Thus, by enacting the changes to the operating parameters of the vehicle, the desired/requested driving profile is achieved.

In the illustrated example of FIG. 2, the example instruction generator 203 receives and/or obtains an identification of a requested driving profile from the example interface controller 202. The example instruction generator 203 retrieves and/or copies the requested driving profile from the example driving profile datastore 207. The example instruction generator 203 parses the obtained driving profile by operating parameters. That is, the example instruction generator 203 determines all operating parameters associated with that driving profile. For example, the example instruction generator 203 may iterate over the driving profile using string matching operations to detect operating parameters. In other examples, as the example instruction generator 203 iterates over the driving profile, it may generate a data structure (e.g., an XML, log, and/or text file) containing detected operating parameters from the driving profile. When the requested driving profile is parsed for operating parameter, the parsed operating parameters are passed to the example safety controller 206 so that they may be validated.

In some examples, each of the ECUs 132 in the illustrated example FIG. 1 may not use the same instruction set. For example, one ECU may accept instructions in embedded C programming language while another only accepts instructions in a proprietary C variant language and/or C++. Yet other example ECUs may be FPGA's which only accept instructions in VHDL and/or Verilog.

The example instruction generator 203 determines which ECUs 132 are associated with the parsed operating parameters to properly generate operating parameter change instructions. To that end, the example instruction generator 203 is provided with a table listing ECUs, the ECU's instruction set language, and which operating parameters the ECU uses. For example, gear shift timing, engine air intake angle, and coolant flow rate may be associated with the engine ECU, which communicates in embedded C and/or any other suitable language. Braking response may be associated with another ECU communicating in VHDL and/or any other suitable language. Thus, by utilizing this table the example instruction generator 203 may generate properly coded instructions to each ECU associated with each operating parameter such that proper adjustments are made in view of the requested driving profile. For example, the engine air intake angle operating parameter is adjusted through an embedded C command issued to the engine ECU by the example instruction generator 203.

The example safety controller 206 verifies that the example vehicle 102 can implement the changes to the operating parameters using a vehicle-specific set of limitations. In the illustrated example FIG. 2, the example safety controller 206 is provided with a set of safety values for each operating parameter. For example, the safety values may indicate the maximum mechanical capability of the system subject to the operating parameter. In other examples, the safety values are indicative of the safest allowable operating parameter for a given vehicle (e.g., a safety value set by the National Transportation Safety Board). In some examples, where a safety "value" is not proper (e.g., a display or audio configuration operating parameter) a list and/or sublist of acceptable parameters may be used.

When the parsed operating parameters are transmitted from the instruction generator 203, the example safety controller 206 verifies that the operating parameter from the requested driving profile does not violate (e.g., exceed or fail to meet) the safety value. If the safety controller 206 evaluates and verifies operating parameters, the verified operating parameter is transmitted back to the instruction generator 203. If the safety controller 206 evaluates an operating parameter and the operating parameter violates the corresponding safety value, the safety controller 206 notifies the instruction generator 203 to not create and/or transmit instructions to the ECU 132 to change the violating operating parameter. In other examples, the safety controller 206 may inform the instruction generator 203 to adjust the operating parameter to conform to the corresponding safety value (e.g., by decrementing or incrementing the operating parameter).

The example driving profile data store 207 stores driving profiles acquired by the interface controller 202. In some examples, the driving profiles are acquired remotely via the communication bridge 201. In other examples, the example driving profiled data store 207 is constructed with stored driving profiles. The example driving profile datastore 207 of the illustrated example stores driving profiles in a tabular and/or delimited style.

While an example manner of implementing the PCU 134 of FIG. 1 is illustrated in FIG. 2, one or more of the elements, processes and/or devices illustrated in FIG. 2 may be combined, divided, re-arranged, omitted, eliminated and/or implemented in any other way. Further, the example interface controller 202, example instruction generator 203, example communication bridge 201, example safety controller 206, and example driving profile data store 207 and/or, more generally, the example PCU 134 of FIG. 2 may be implemented by hardware, software, firmware and/or any combination of hardware, software and/or firmware. Thus, for example, any of the example interface controller 202, example instruction generator 203, example communication bridge 201, example safety controller 206, and example driving profile data store 207 and/or, more generally, the example PCU 134 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface controller 202, example instruction generator 203, example communication bridge 201, example safety controller 206, and example driving profile data store 207 is/are hereby expressly defined to include a tangible computer readable storage device or storage disk such as a memory, a digital versatile disk (DVD), a compact disk (CD), a Blu-ray disk, etc. storing the software and/or firmware. Further still, the example PCU 134 of FIG. 2 may include one or more elements, processes and/or devices in addition to, or instead of, those illustrated in FIG. 4, and/or may include more than one of any or all of the illustrated elements, processes and devices.

FIG. 3 illustrates a table 300 of example driving profiles 305 stored by the example performance control unit 134 on the example vehicle 102 of FIG. 1. Driving profiles 305 include a plurality of operating parameters changeable by the example PCU 134. For example, the PCU 134 may communicate instructions to a corresponding ECU (e.g., ECU 132A) to alter a mechanical or electrical component of the vehicle 102 according to a corresponding operating parameter. The example driving profiles 305 include operating parameters such as stroke length 310, braking force 320, air intake angle 330, gear ratio 340, suspension height 350, and console display type 360. It will be appreciated that the foregoing operating parameters are but a small sample of operating parameters that may be included in such driving profiles 305.

The example stroke length 310 operating parameter directs the corresponding ECU 132 to adjust the distance in which the pistons in the engine of the example vehicle 102 travel during a "stroke" (e.g., a reciprocating motion cycle). For example, the example PCU 134 changes this operating parameter by communicating with an ECU controlling the engine of the example vehicle 102. The example PCU 134 transmits instructions to change the mechanical seating of the piston on the crankshaft to effectuate the desired travel distance (e.g., stroke length) of the piston. The example braking force 320 operating parameter controls the force (in Newtons) with which the corresponding ECU 132 directs the brake calipers to apply to the wheel discs on the example vehicle 102. The example air intake angle 330 operating parameter directs an ECU 132 to limit an angle of the manifold device of the engine of the example vehicle 102. The example gear ratio 340 operating parameter directs an ECU 132 to adjust the gear ratio of the transmission of the example vehicle 102 (e.g., adjusting a continuously variable transmission gear box). The example suspension height 350 operating parameter directs an ECU 132 to adjust the suspension height to a certain height from the top of the wheels. For example, the ECU 132 may use hydraulic and or air compression systems to raise or lower the body of the example vehicle 102 to the desired height. The example coolant flow rate 360 operating parameter directs an ECU 132 to adjust the coolant pump of the example vehicle to achieve a target flow rate in liters per minute.

Each operating parameter is representative of the behavior of each vehicle type represented in the driving profiles 205. For example, the sports car and supercar have operating parameters that, when implemented, achieve a fast, technical level of performance while operating the example vehicle 102. The example luxury sedan and SUV driving profiles have operating parameters that, when implemented, achieve a smooth and/or comfortable level of performance. Thus, by implementing one of the driving profiles, the example vehicle 102 emulates the level of performance of the implemented driving profile. For example, using the sports car driving profile, the example vehicle 102 will operate like, and achieve the levels of performance of a sports car.

FIG. 4 illustrates a table 400 of example safety values of the example vehicle 102 stored by the example safety controller 206 of FIG. 2. The safety values correspond to the vehicle 405 in which the example PCU 134 of FIG. 1 is included. In the illustrated example, the table 400 of example safety values corresponds to the example vehicle 102 of FIG. 1. The table 400 of example safety values includes maximum stroke length 410, maximum braking force 415, maximum air intake angle 420, maximum gear ratio 425, maximum suspension height 430 and maximum coolant flow rate 435. When a driving profile is selected (e.g., one from table 300 of FIG. 3), the example safety controller 206 verifies that each operating parameter conforms to each corresponding safety value from the table 400.

Figure 5:
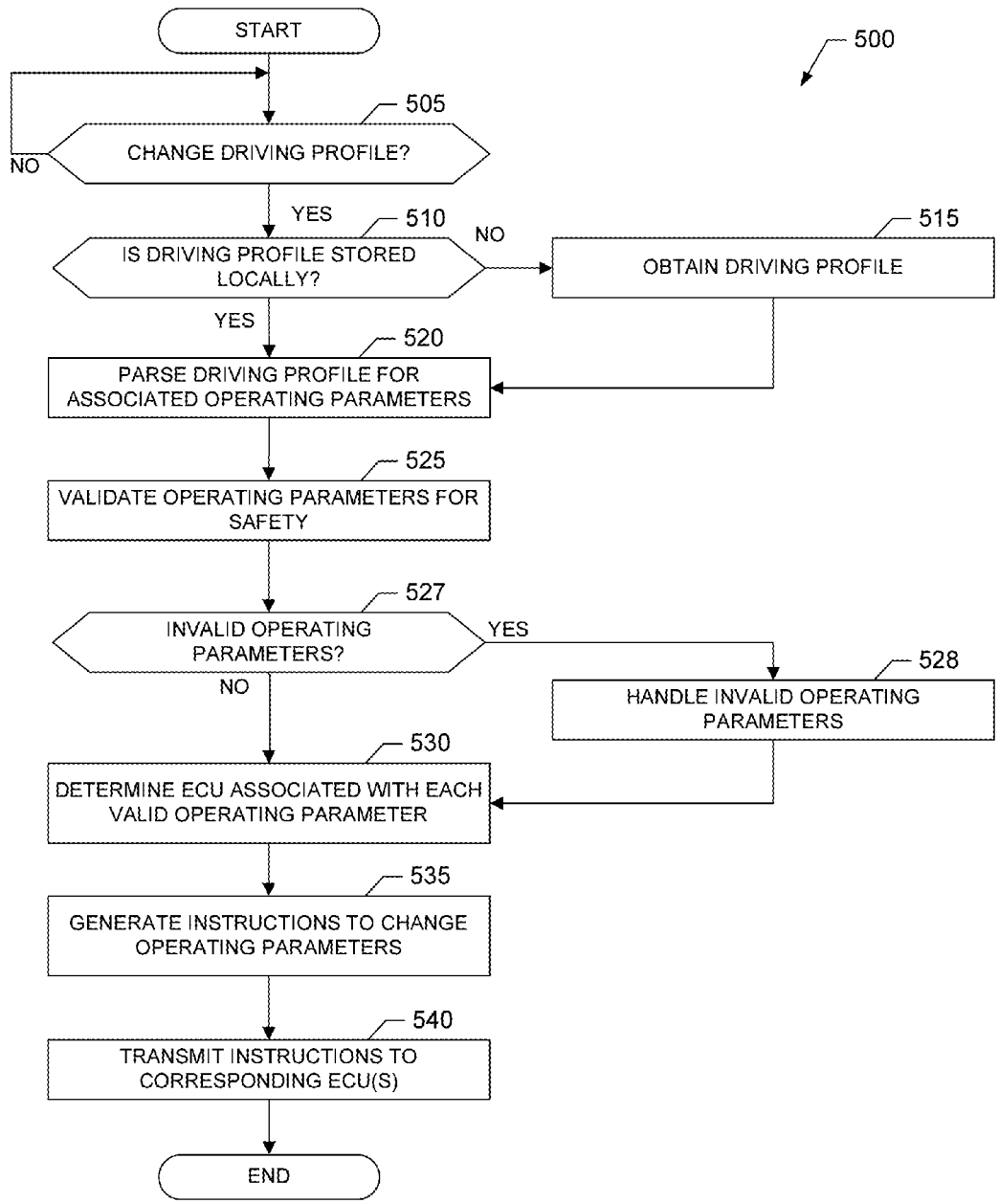
FIG. 5 is a flow diagram representative of example machine readable instructions that may be executed to implement the example performance control unit of FIGS. 1 and/or 2 alter the driving profile of a vehicle.

A flowchart representative of example machine readable instructions for implementing the example PCU 134 of FIGS. 1 and/or 2 is shown in FIG. 5. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example PCU 134 of FIGS. 1 and/or 2 may alternatively be used. For example, the order of execution of the blocks may be changed, and/or some of the blocks described may be changed, eliminated, or combined.

As mentioned above, the example processes of FIG. 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is a flow diagram of representative of machine readable instructions 500 that may be executed to implement the example PCU 134 of FIG. 1 to alter the driving profile of a vehicle.

The instructions 500 of FIG. 5 begin at block 505 where the interface controller 202 determines if a change in driving profile has been requested. If no request to change the driving profile is detected by the example interface controller 202, the example interface controller 202 continues to monitor for such a request. When the request to change the driving profile is detected by the example interface controller 202, the example interface controller 202 determines if the requested driving profile is stored locally in the driving profile datastore 207 (block 510). If the requested driving profile is stored locally, control proceeds to block 520.

If the driving profile is not stored locally, the example interface controller 202 obtains the requested driving profile (block 515). For example, the interface controller 202 may generate a request to a remote server and/or remote device to obtain the driving profile using the example communication bridge 201. For ease of serving future requests, when the requested driving profile has been obtained, the example interface controller 202 stores the driving profile in the example driving profile datastore 207.

With the driving profile stored locally, the example instruction generator 203 parses the requested driving profile for operating parameters (block 520). For example, the instruction generator 203 analyzes the driving profile to detect and identify operating parameters and their values stored in, or associated with the requested driving profile. When the operating parameters (e.g., stroke length 310 of example FIG. 3) are detected by the example instruction generator 203, the operating parameters are transmitted to the example safety controller 206 by the example instruction generator 203.

The example safety controller 206 attempts to validate the operating parameters of the driving profile against the corresponding safety values for the operating parameters according to the physical and safety limitations of the current vehicle (e.g., max stroke length 410 of FIG. 4) (block 525). If there are operating parameters in the requested driving profile that violate the safety values, the safety controller 206 marks the violating operating parameters as invalid. If no operating parameter in the requested driving profile violates the safety rules, control moves proceeds to block 530.

When the example safety controller 206 has attempted to validate the operating parameters, the safety controller 206 determines if any operating parameters have been marked invalid (block 527). If there are invalid operating parameters, the safety controller 206 handles the invalid operating parameters (block 528). For example, the safety controller 206 may remove the invalid operating parameters from the driving profile. In other examples, the safety controller 206 may adjust the invalid operating parameter to conform to the corresponding safety value, and by doing so, creating a valid operating parameter. In yet other examples the safety controller may implement a mix of removal and adjustment of the invalid operating parameters.

The validated operating parameters are retrieved by the example instruction generator 203 and processed to determine the appropriate ECU 132 to transmit operating parameter change instructions (block 530). The example instruction generator 203 then generates operating parameter change instructions for each ECU 132 according to the identity, instruction set (e.g., programming language), and operating parameters (block 535). When the instructions are generated by the example instruction generator 203, the instruction generator 203 transmits the operating parameter change instructions to the appropriate ECUs 132 through the example communication bridge 201 (block 540). The example instructions 500 then end at the termination of block 540. In some examples, though, the instructions return to block 505 to monitor for changes to the driving profile. In other examples, the instructions begin again at the termination of block 540.

Figure 6:
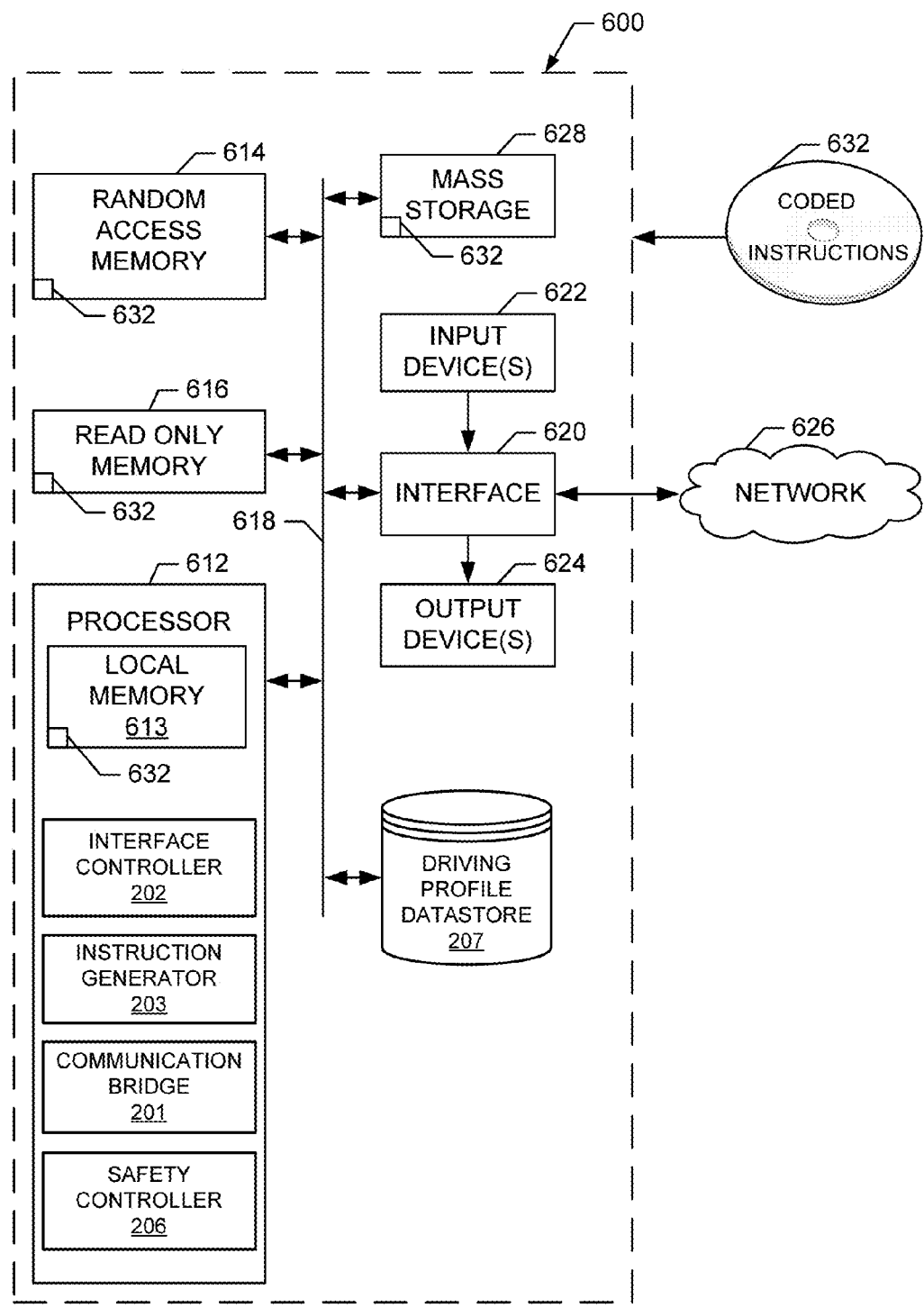
FIG. 6 is a block diagram of an example processor system structured to execute the example machine readable instructions represented by FIG. 4 to implement the example performance control unit of FIGS. 1 and/or 2.

FIG. 6 is a block diagram of an example processor platform 1000 capable of executing the instructions of FIG. 5 to implement the example PCU 134 of FIGS. 1 and/or 2. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 1012 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIG. 5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods and apparatus alter the driving profile of a vehicle. For example, in lieu of having to own a fleet of different vehicles to experience different driving profiles, a consumer need only purchase one example PCU to experience a diverse range of driving sensations. Where before a consumer had to manually rebuild their car to achieve such results, the methods and apparatus disclosed herein advance vehicle technology to satisfy changing desires of a consumer at the press of a button.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   determining, based on a user selection, a desired driving profile to apply to a vehicle;
   identifying a set of alterations to operating parameters of vehicle systems associated with the desired driving profile;
   determining a first subset of the set of the alterations to the operating parameters that the vehicle can execute by validating the set of the alterations against a set of rules defining operation of the vehicle, wherein the validating includes:
      marking first ones of the operating parameters of the set of the alterations as valid when the first ones of the operating parameters of the set of the alterations conform to the set of rules defining the operation of the vehicle;
      marking second ones of the operating parameters of the set of the alterations as invalid when the second ones of the operating parameters of the set of the alterations do not conform to the set of rules defining the operation of the vehicle; and
      storing the first ones of the operating parameters as the first subset of the set of the alterations that the vehicle can execute; and
   in response to determining the first subset that the vehicle can execute, applying the first subset to the vehicle to produce the desired driving profile.

2. The method of claim 1, further comprising:
   determining instructions associated with the first subset of the set of the alterations; and
   transmitting the instructions to a corresponding electronic control unit of the vehicle.

3. The method of claim 1, wherein the set of the alterations includes alterations affecting mechanical components of the vehicle.

4. The method of claim 1, wherein the desired driving profile is selected through a console display of an infotainment unit of the vehicle.

5. The method of claim 1, further comprising:
   determining the desired driving profile is not stored on the vehicle; and
   generating a request to a remote server to obtain the desired driving profile.

6. The method of claim 5, further comprising:
   obtaining the desired driving profile from the remote server; and
   storing the desired driving profile on the vehicle.

7. The method of claim 1, further including:
   adjusting at least one of the second ones of the operating parameters marked as invalid to conform to the set of rules defining the operation of the vehicle;
   marking the at least one of the second ones of the operating parameters as valid; and
   storing the at least one of the second ones of the operating parameters as part of the first subset of the set of the alterations that the vehicle can execute.

8. A tangible article of manufacture comprising instructions that, when executed, cause a machine to perform operations comprising:
   determining, based on a user selection, a desired driving profile to apply to a vehicle;
   identifying a set of alterations to operating parameters of vehicle systems associated with the desired driving profile;
   determining a first subset of the set of the alterations to the operating parameters that the vehicle can execute by validating the set of the alterations against a set of rules defining operation of the vehicle, wherein the validating includes:
      marking first ones of the operating parameters of the set of the alterations as valid when the first ones of the operating parameters of the set of the alterations conform to the set of rules defining operation of the vehicle;
      marking second ones of the operating parameters of the set of the alterations as invalid when the second ones of the operating parameters of the set of the alterations do not conform to the set of rules defining operation of the vehicle;
      storing the first ones of the operating parameters as the first subset of the set of the alterations that the vehicle may execute; and
   applying the first subset to the vehicle to produce the desired driving profile when it is determined that the first subset of the set of the alterations is executable by the vehicle.

9. The tangible article of manufacture of claim 8, wherein the operations further include:
   determining instructions associated with the first subset of the set of alterations; and transmitting the instructions to a corresponding electronic control unit of the vehicle.

10. The tangible article of manufacture of claim 8, wherein the set of the alterations includes alterations affecting mechanical components of the vehicle.

11. The tangible article of manufacture of claim 8, wherein the desired driving profile is selected through a console display of an infotainment unit of the vehicle.

12. The tangible article of manufacture of claim 8, wherein the instructions further include:
   determining the desired driving profile is not stored on the vehicle; and
   generating a request to remote server to obtain the desired driving profile.

13. The tangible article of manufacture of claim 12, wherein the instructions further include:
   obtaining the desired driving profile from the remote device; and
   storing the desired driving profile on the vehicle.

14. The tangible article of manufacture of claim 8, wherein the operations further comprise:
   adjusting at least one of the second ones of the operating parameters marked as invalid to conform to the set of rules defining the operation of the vehicle;
   marking the at least one of the second ones of the operating parameters as valid; and
   storing the at least one of the second ones of the operating parameters as part of the first subset of the set of the alterations that the vehicle can execute.

15. An apparatus comprising:
   a processor; and
   a memory to store machine readable instructions that, when executed by the processor, cause the processor to perform operations comprising:
      determining, based on a user selection, a desired driving profile to apply to a vehicle;
      identifying a set of alterations to operating parameters of vehicle systems associated with the desired driving profile;
      determining a first subset of the set of the alterations to the operating parameters that the vehicle can execute by validating the set of the alterations against a set of rules defining operation of the vehicle, wherein the validating includes:
         marking first ones of the operating parameters of the set of the alterations as valid when the first ones of the operating parameters of the set of the alterations conform to the set of rules defining operation of the vehicle;
         marking second ones of the operating parameters of the set of the alterations as invalid when the second ones of the operating parameters of the set of the alterations do not conform to the set of rules defining operation of the vehicle;
         storing the first ones of the operating parameters as the first subset of the set of the alterations that the vehicle may execute; and
      in response to determining the subset that the vehicle can execute, applying the subset to the vehicle to produce the desired driving profile.

16. The apparatus of claim 15, wherein the operations further comprise determining instructions associated with the first subset of the set of alterations.

17. The apparatus of claim 16, wherein the operations further comprise transmitting the instructions to a corresponding electronic control unit of the vehicle.

18. The apparatus of claim 15, wherein the operations further comprise:
   determining the desired driving profile is not stored on the vehicle; and
   generating a request to remote server to obtain the desired driving profile.

19. The apparatus of claim 18, wherein the operations further comprise:
   obtaining the desired driving profile from the remote device; and
   storing the desired driving profile on the vehicle.

20. The apparatus of claim 15, wherein the operations further comprise:
   adjusting at least one of the second ones of the operating parameters marked as invalid to conform to the set of rules defining operation of the vehicle;
   marking the at least one of the second ones of the operating parameters as valid; and
   storing the at least one of the second ones of the operating parameters as part of the first subset of the set of the alterations that the vehicle can execute.

* * * * *